United States Patent [19]

Priaroggia

[11] Patent Number: 4,722,589
[45] Date of Patent: Feb. 2, 1988

[54] PRESSURE RESISTANT OPTICAL FIBER CABLE

[75] Inventor: Paolo G. Priaroggia, Milan, Italy

[73] Assignee: Societa' Cavi Pirelli S.p.A., Milan, Italy

[21] Appl. No.: 831,998

[22] Filed: Feb. 20, 1986

Related U.S. Application Data

[63] Continuation-in-part of Ser. No. 723,039, Apr. 15, 1985, Pat. No. 4,690,498.

[30] Foreign Application Priority Data

Feb. 26, 1985 [IT] Italy ............................ 19655 A/85

[51] Int. Cl.⁴ .................................................. G02B 6/44
[52] U.S. Cl. .................................. 350/96.23; 174/70 R
[58] Field of Search ..................... 174/70 R; 350/96.23

[56] References Cited

U.S. PATENT DOCUMENTS

| | | | |
|---|---|---|---|
| 3,710,006 | 1/1973 | Davis | 350/96.23 X |
| 4,143,942 | 3/1979 | Anderson | 350/96.23 |
| 4,153,332 | 5/1979 | Longoni | 350/96.23 |
| 4,574,192 | 3/1986 | Kitagawa et al. | 350/96.23 X |

FOREIGN PATENT DOCUMENTS

| | | | |
|---|---|---|---|
| 1422956 | 1/1976 | United Kingdom | 350/96.23 |
| 2021282 | 11/1979 | United Kingdom | 350/96.23 |
| 1572299 | 7/1980 | United Kingdom | 350/96.23 |
| 1598540 | 9/1981 | United Kingdom | 350/96.23 |

Primary Examiner—John Lee
Attorney, Agent, or Firm—Brooks Haidt Haffner & Delahunty

[57] ABSTRACT

A submarine cable with optical fibers which prevents damage to the fibers due to tensile stresses or water pressure without the use of an external armor. The cable has a central core with an anti-torsional wire rope around which a plurality of tubes are helically wound. Each tube loosely contains at least one optical fiber, and the spaces within the tubes and any spaces within the rope are filled with a substantially incompressible fluid. The core is surrounded by a sheath of plastic material which contacts the tubes and the rope in a manner which eliminates voids between the sheath and the core elements. The rope may have a cladding of plastic material, and the rope may have a wire or tape of good conductivity metal for supplying electrical power to repeaters.

6 Claims, 1 Drawing Figure

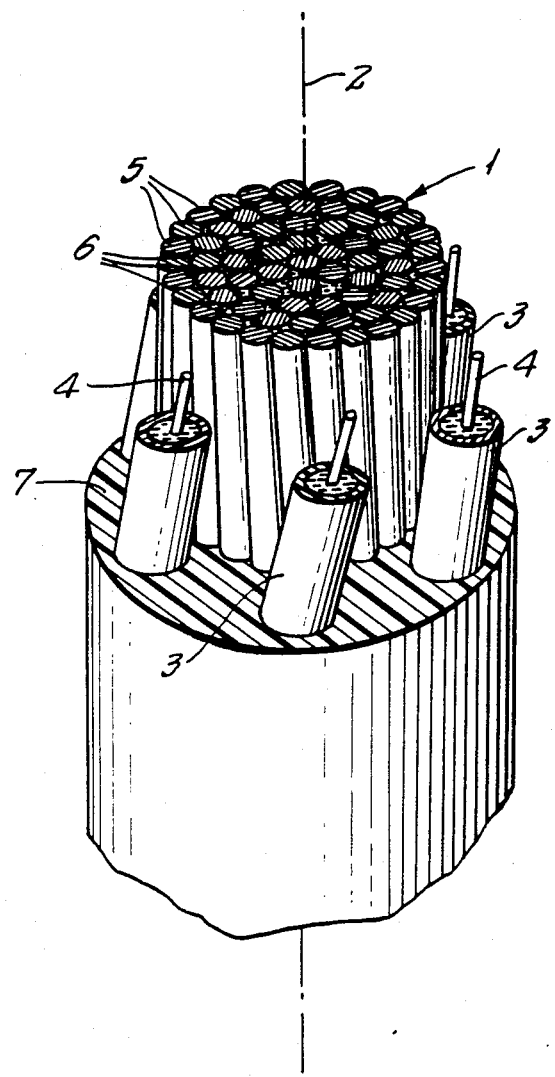

PRESSURE RESISTANT OPTICAL FIBER CABLE

This application is a continuation-in-part of my copending application Ser. No. 723,039 filed Apr. 15, 1985 and entitled "Pressure Resistant Submarine Optical Fiber Cable" (now U.S. Pat. No. 4,690,498).

The present invention relates to a submarine cable including optical fibers for telecommunication purposes which is particularly suited for being laid and operated at deep levels in the sea.

Submarine, optical fibers telecommunication cables are subjected to high mechanical stresses, but because of their fragility, the optical fibers contained inside cables have to be protected from undergoing even the slightest stresses. In fact, optical fibers cannot only break easily but also even the very slightest mechanical stresses imparted to them can cause an attenuation of the signals transmitted. Should any of such events take place, the cable is not satisfactory for use.

The main factors causing mechanical stresses, in submarine cables which are used for optical fiber telecommunication are as follows:

(1) The ambient in which the cable is operated, which gives rise to stresses in the cables due to the hydrostatic pressure which is exercised by the water. The stresses on the cable, due to this factor, become increased as the laying-depth for the cable is increased.

(2) The laying operations that subject the cable to tensile stresses. These stresses increase whenever the laying depth becomes increased, due to the greater weight, in suspension of the cable tract during this operation.

(3) The thermal variations to which the cable can be subjected during its transportation from the factory to the site where it has to be layed which cause mechanical stresses to occur in the sheath because of the greater thermal expansion of the cable core with respect to that of the sheath, the materials out of which said elements, in the known cables, are constructed being different.

For protecting these optical fibers, the known submarine optical fiber telecommunication cables have a structure which comprises a metallic sheath and a mechanically-resistant armoring (the dimensions of which increase depending upon the laying-depth) which is placed around a core wherein the optical fibers are housed. Known submarine optical fiber telecommunication cables are, for example, those described in the U.K. Patent Application No. 2,021,282 and in the U.K. Patent Application No. 2,082,790.

In known submarine optical fiber telecommunication cables, the presence of a metallic sheath and of a mechanically-resistant armoring which is disposed so as to surround the cable-core, render these elements very inflexible which further complicates the laying operations. The sheath and armoring are, themselves, rigid and are spaced from the cable axis, which represents the neutral flexing axis.

Moreover, when the depth at which the cable is intended to be laid is increased, the flexibility of the cable also decreases considerably, both because the dimensions of the mechanically-resistant armoring are increased due to the greater applied stresses and because the dimensions of said armoring are increased, the armoring being obtained by placing mechanically-resistant material outside of the cable and hence, in a position which is further away from the neutral flexing axis.

One object of the present invention is to provide an optical fiber telecommunication cable which is adapted for laying at great depths, for example, at depths of over 1000 meters, and which has a greater flexibility when compared to known cables. Moreover, such a cable has a reduced weight per unit length, and is not subject to damage should it undergo temperature variations during its transportation from the factory to the laying site.

The principal object of the present invention is a submarine, optical fiber cable for telecommunications, which comprises a plurality of optical fibers disposed around a central core which is enclosed inside a sheath, characterized by the fact that the core comprises a mechanically-resistant armoring constituted by a compact antitorsional rope having a cross-section of not less than 50 mm$^2$ and which is disposed at the radially innermost portion of the cable with the rope axis being coincident with the cable's axis and with the interspaces, inbetween the component rope fibers, being filled with a substantially incompressible fluid. The cable has a plurality of small tubes, filled with a substantially incompressible fluid, in which the optical fibers are loosely housed and which are wound helically on the outer surface of the armoring. The sheath is made out of plastic with its radially innermost surface so shaped as to complement the outer surface of the core comprising the armoring-tubes assembly. The cable is entirely devoid of any watertight metallic sheath and of any mechanically-resistant armoring intended to withstand the water pressure and placed radially outwardly of the core so as to surround the zone wherein the optical fibers are disposed.

In this text, by the term "substantially incompressible fluid" is meant a liquid substance and preferably, a viscous substance which may have a high viscosity. Gases are excluded from the scope of this term.

The compact antitorsional rope comprising the armoring of a submarine cable according to the invention is selected for substantially totally resisting tractional stresses during the laying operation and in addition, the cross-section of said rope is not less than 50 mm$^2$.

Other objects and advantages of the present invention will be apparent from the following detailed description of the presently preferred embodiments thereof, which description should be considered in conjunction with the single FIGURE of the accompanying drawing which is a perspective view of a portion of a cable of the invention with some elements removed for illustration purposes.

As shown in the drawing, the cable includes a core comprising an armoring 1, the axis of which coincides with the longitidunal axis 2 of the cable, and a plurality of small tubes 3, loosely housing optical fibers 4 and wound helically and in direct contact with the armoring 1 in the manner explained, in greater detail, hereinafter.

The small tubes 3, which are made, for example, of plastic or of other materials, are filled with a substantially incompressible fluid such as, for example, a petroleum jelly, a silicone grease, or similar incompressible but flowable materials.

The armoring 1A which occupies the radially innermost zone of the cable is selected and hence, dimensioned, for totally resisting tractional stresses which are imparted to the cable during the laying operation. Said armoring 1, which, preferably, is constituted by a compact anti-torsional rope having a cross-section of not less than 50 mm$^2$, is formed by a plurality of wires 5, made out of a material having a very high mechanical resistance to tractions or tension, such as, for example, steel, aromatic polyamides, carbon fibers, and the like. The interspaces 6, existing in-between the wires 5, are filled up by a substantially incompressible fluid such as one of the fluids previously identified.

The wires 5 are disposed helically in coaxial overlapping layers, and the winding direction of the wires in one layer preferably is opposite to that of the wires in the adjacent layers. With such a disposition of the wires 5 and whenever the rope is subjected to tension, the armoring does not undergo any torsion and hence, it has a good flexibility.

As previously stated, the tubes 3 are wound helically in direct contact with the armoring 1 which is constituted by the previously described, compact, anti-torsional rope. In particular, the helicoidal winding of the tubes 3 can be as a closed-helix or an open-helix, meaning by this latter term that the lay-out, of each small tube, is comprised of alternating S-shaped or Z-shaped lengths.

Over the cable core that is constituted by the assembly of the armoring 1 and the plurality of tubes 3, there is disposed a plastic sheath 7 obtained, for example, by means of extrusion of the plastic over the core. The sheath 7 engages the tubes 3 and mates, at its radially innermost surface, with the outermost surfaces of the armoring 1 and tubes 3. In this manner, the radially innermost surface of the plastic sheath 7, has a form which is complementary to the outer surface of the armoring 1-tubes 3 assembly, and because of this, no voids exist between said plastic sheath 7 and said assembly.

For forming the sheath 7, there can be used, for example, polyolefins, such as, polyethylene and polypropylene, aliphatic polyamids and the like. Preferably, the sheath 7 is made of an aliphatic polyamid because such material renders the sheath radially less contractile under the action of hydrostatic pressure. In this way, there is prevented, along the cable, any consequent small variations in the diameter dimensions of the tubes 3 and longitudinal movements of the incompressible fluid filling the tubes 3 due to contractions of the sheath 7.

Over the plastic sheath 7, there can be other elements (not shown in the drawing), such as, for example, anti-shipworm protections of the per se known type, a winding of good electrical conductivity metallic tapes, either insulated or not. In practice, none of these elements should provide, through their presence, either a continuous, watertight, metallic sheath, or a mechanically-resistant armoring of sufficient resistance to, by itself, protect the optical fibers.

By such construction, a cable according to the invention is devoid of any continuous, watertight, metallic sheath and of any armoring which is disposed radially outside the cable core, which surrounds the zone wherein the optical fibers are housed and which, by itself, can withstand the mechanical stresses to which the cable is subjected.

As an alternative variation (not shown) of a cable according to the invention, the armoring 1 is clad by a plastic covering layer which adheres to it closely and eliminates any interspaces. Such layer may be made, for example, out of a polyolefin, such as polyethylene, polypropylene, an aliphatic polyamid and the like.

The tubes 3, filled with a substantially incompressible fluid and in which the optical fibers are loosely housed, are wound in direct contact with the plastic covering layer. In this embodiment, the plastic sheath 7 of the cable has its radially innermost surface of a form which complements the outer surface of the assembly made by the covering layer and tubes.

According to another alternative embodiment for cables, according to the invention, the armoring, constituted by a compact anti-torsional rope, comprises a longitudinal metallic element of a high electrical conductivity so as to provide an electrical conductor for the feeding of the optoelectronic repeaters for the signals transmitted by the optical fibers, which are disposed along the cable. For example, the longitudinal metallic element having a high electrical conductivity may be constituted by at least one copper wire which, for example, either replaces one of the wires 5 or is wound around the compact anti-torsional rope 1. In this case, the return conductor can be the sea.

As an alternative, the return conductor may be a combination of the sea and of a metal tape of good electrical conductivity wound around the sheath 7 or embedded in the latter.

According to a further variation, used in the case when no longitudinal metallic element having a high electrical conductivity is within or on the cable armoring, the feeding of the optoelectronic repeaters can be accomplished through an electric circuit comprising a good electrical conductivity metal tape which is surrounded by insulation and which is wound around the sheath 7, the sea being utilized as a return conductor.

It should be understood however, that no matter what the configuration of the good electrical conductor metallic tapes may be, e.g. either around, or inside the sheath, such tapes must neither provide a watertight metallic sheath nor a mechanically-resistant armoring for the cable.

From the description given hereinbefore and from the following considerations, it will be understood that, by means of the cables according to the invention, the stated objects can be achieved.

In the submarine optical fiber telecommunication cables according to the invention, no metallic elements which are intended to absorb the stresses to which the cable is subjected are to be found around the core wherein the optical fibers are disposed. In fact, the armoring for the cable is disposed at the innermost zone of the cable, near to its axis, and the sheath is made of a plastic and not of a metallic material as in the known submarine cables.

As a consequence, the flexibility of the cables according to the invention is greater than for the known cables, both because the armoring is disposed exclusively near to the longitudinal axis of the cable which is the neutral axis of flexing and because the plastic sheath is more flexible than a metallic sheath. In this manner, there is obtained a reduction in weight per length unit of the cable as compared to known cables.

Moreover, even in the absence of a watertight sheath and of armoring around the sheath wherein the optical fibers are disposed, no risks are to be feared that the cable structure will collapse under the action of hydrostatic pressure, even at great sea depths.

In fact, the resistance to hydrostatic pressure of the cables according to the invention is ensured by the fact of no spaces, devoid of solid or substantially incompressible material, are found in the cable structure since both the inter-spaces existing between the wires of the rope that forms the armoring as well as the tubes housing the optical fibers, are all filled with a substantially incompressible fluid. Moreover, the radially innermost surface of the plastic sheath adheres perfectly to the cable core without leaving any interstices.

Moreover, the absence of any armoring around a cable core, eliminates the danger which exists in the known cables, namely, an armoring around the core can compress the cable core and hence, cause stresses in the optical fibers when, during the laying operation, said armoring tends to grip the core due to the effects of the tensile stresses imposed on it.

In the cables according to the invention, the sheath is made of plastic and not of a metallic material, as is the case of the known submarine optical fiber cables.

In the known cables, the presence of a continuous watertight metallic sheath for surrounding the zone occupied by the optical fibers has been considered, to this time, indispensible in order to prevent even small traces of water from penetrating into the cable and reaching the optical fibers with the resulting attenuation of the transmitted signals, as well as embrittlements.

In the cables according to the invention, in spite of the presence of a plastic sheath which cannot guarantee an impermeability equal to that of a watertight metallic sheath, there have not been found, in practice, any of the drawbacks for the optical fibers which would be forecast when the outer, watertight, metal sheath is omitted.

In the cables according to the invention, the elimination of the metallic sheath, which is replaced by a plastic sheath, renders the cables free from the risks resulting from the temperature variations to which a cable can be subjected during its transportation from the manufacturing zone to the cable-laying area. In fact, as compared to a metallic sheath, a plastic sheath has a greater ability for expansion. Therefore, owing to this expansibility of a plastic sheath, there are no dangers of ruptures or of crackings, as could occur with metallic sheaths, whenever the thermal expansions of the elements, which are enclosed within the sheath, are caused by temperature increases which can take place due to a direct exposure of the cables to the sun.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A submarine, telecommunication cable comprising:
   an axially disposed and extending armor comprising a strand of wires, said strand having, by itself, a tensile strength sufficient to withstand the tensile stresses to which the cable is subjected during laying and recovery thereof;
   a plurality of tubes helically wound around and contacting said armor in circumferentially spaced relation to each other;
   a substantially incompressible fluid disposed in and filling-up any spaces within said armor including any spaces between said wires;
   at least one optical fiber loosely received in each of said tubes;
   a substantially incompressible fluid disposed in and filling-up the spaces between the interior of said tubes and said optical fibers; and
   a water tight sheath of plastic material around said tubes and said armor, the innermost surface of said sheath of plastic material contacting said tubes and said armor and said sheath filling the spaces between said tubes, said water tight plastic sheath, by itself, having a resistance to compression which is insufficient to withstand the compression forces to which the cable is subjected during use;
   said cable being without armor externally of said sheath of plastic material which, by itself, can withstand the mechanical stresses to which the cable is subjected in use;
   whereby said cable is able to withstand hydrostatic pressures to which it is subjected when submerged without any armor outwardly of the optical fiber or fibers which by itself can withstand such pressures.

2. A submarine, telecommunication cable as set forth in claim 1, wherein said armor has a cladding layer thereon which adheres closely thereto so as to eliminate any voids between said cladding layer and said armor and wherein said tubes are helically wound around and in contact with the outer surface of said cladding layer.

3. A submarine, telecommunication cable as set forth in claim 1, wherein said plastic material of said sheath is selected from the group consisting of polyolefins and aliphatic polyamides.

4. A submarine, telecommunication cable as set forth in claim 3, wherein said armor is formed by layers of helically wound wires, the adjacent layers being oppositely helically wound and wherein said wires are made of a high tensile strength material selected from the group consisting of steel, aromatic polyamides and carbon fibers.

5. A submarine, telecommunication cable as set forth in claim 1, wherein said armor includes an electrically conductive metal wire extending in the axial direction of said armor.

6. A submarine, telecommunication cable as set forth in claim 5, wherein said electrically conductive metal wire is a copper wire.

* * * * *